W. L. ALMQUIST.
LICENSE BRACKET FOR AUTOMOBILES.
APPLICATION FILED MAR. 29, 1919.

1,323,211.

Patented Nov. 25, 1919.

INVENTOR
W. L. ALMQUIST
BY HIS ATTORNEY

A. E. Carlsen.

UNITED STATES PATENT OFFICE.

WALTER L. ALMQUIST, OF BRISTOL, SOUTH DAKOTA.

LICENSE-BRACKET FOR AUTOMOBILES.

1,323,211.  Specification of Letters Patent.  Patented Nov. 25, 1919.

Application filed March 29, 1919. Serial No. 286,168.

*To all whom it may concern:*

Be it known that I, WALTER L. ALMQUIST, a citizen of the United States, residing at Bristol, in the county of Day and State of South Dakota, have invented certain new and useful Improvements in License-Brackets for Automobiles, of which the following is a specification.

My invention relates to license brackets for automobiles and the object is to provide a simple and cheap yet efficient and quickly attachable device, and of such construction and position on the automobile as to firmly hold the license plate in a distinctly visible location but out of the way from any moving element about the car. I overcome the well known objections to the present types of brackets, which hold the license either hanging in the mud or in the way for the crank or else are secured to the radiator cap which it soon weakens, by attaching it to the frame of the wind-shield where it is completely out of the way yet distinctly visible.

Figure 1:
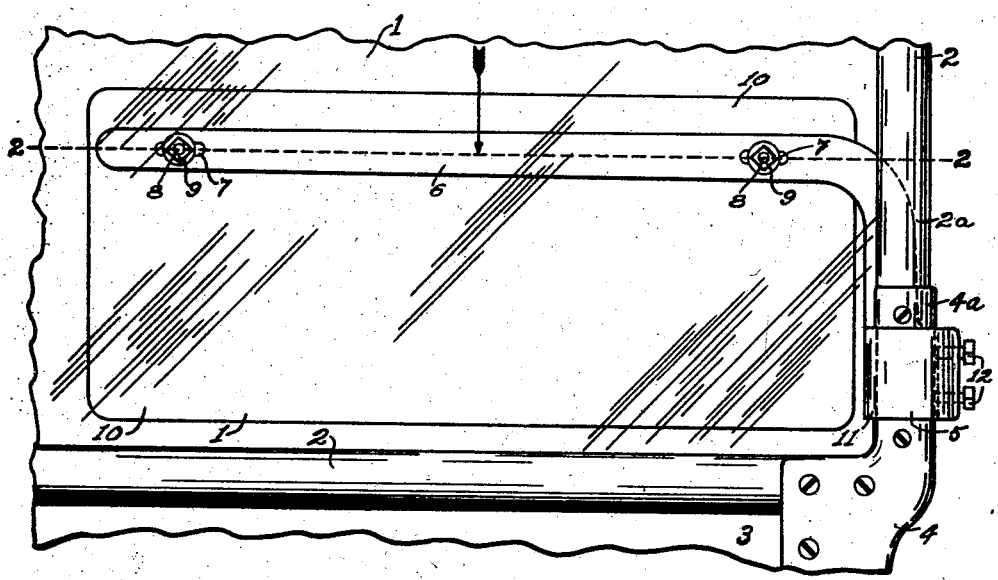
Figure 2:
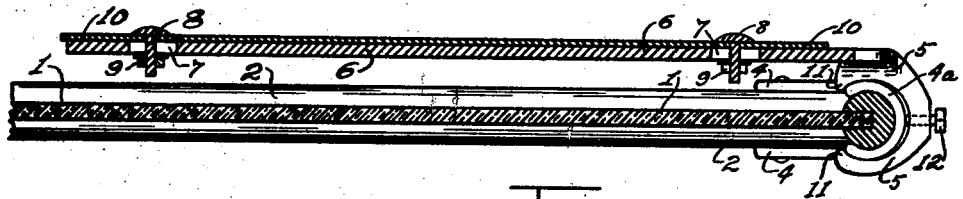
Figure 3:
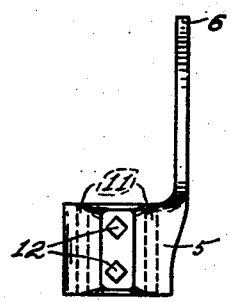

My invention is embodied in the construction clearly shown in the accompanying drawing, in which:

Figure 1 is a rear view of the lower right hand portion of a common form of wind-shield showing my device as attached thereto and with a part of the bracket and the license plate it supports as seen through the glass of the wind-shield. Fig. 2 is a sectional view on the line 2—2 in Fig. 1. Fig. 3 is an end view of the bracket, as seen from the right in Fig. 1, detached from the wind-shield and with the license plate removed.

Referring to the drawing by reference numerals, 1 designates the glass of a wind-shield having a rim or frame 2 supported and held in position on the cowl or frame of the automobile 3 by a stationary bracket 4. The license plate supporting bracket consists of a single piece of material having a gripping jaw or socket 5 at its lower end and a horizontal arm 6 extending from its upper end. Said arm 6 is provided with two horizontal slots 7 in which are adjustably mounted two small bolts 8, having nuts 9, which firmly secure the license plate 10 to the arm 6.

The socket 5 or lower securing end of the bracket consists of a vertical jaw adapted to slide down on and snugly embrace the upward extension $4^a$ of the fixed wind-shield bracket 4. The socket is provided with two integral inwardly inclined parallel lips 11 so spaced as to allow the socket to pass over the rim $2^a$ of the wind-shield, but narrow enough to prevent slipping over the bracket extension $4^a$. The fit of the socket over the bracket extension may be quite snug, but, for the purpose of further securing the grip and to prevent any vibration of the bracket holding the license plate, one or two set-screws 12 are provided which will (see especially Fig. 2) upon tightening hold the bracket perfectly rigid.

The quickness with which the device can be installed or detached and its general convenience and utility are all so obvious that further description and explanation is unnecessary.

Having now fully described my invention, what I claim to be new and desire to protect by Letters Patent is:

The combination with the vertical end portion of a wind-shield frame, of a fixed bracket gripping said vertical end portion and holding it in a rigid position, a license plate supporting bracket adapted to be secured to said fixed bracket, said license plate supporting bracket consisting of an angular license plate holding member and an open socket member integral with the same, said open socket member comprising two integrally formed vertically arranged parallel gripping members, said gripping members being spaced so as to be adapted to slip over a portion of the wind-shield frame adjacent the fixed bracket but to allow only the vertical entrance of said fixed bracket into said socket member, as and for the purpose set forth.

In testimony whereof I affix my signature.

WALTER L. ALMQUIST.